United States Patent
Ohshima et al.

(10) Patent No.: US 9,593,492 B2
(45) Date of Patent: Mar. 14, 2017

(54) LID MEMBER AND FLOOR PANEL USING THE SAME

(71) Applicant: SENQCIA CORPORATION, Tokyo (JP)

(72) Inventors: Takashi Ohshima, Saitama (JP); Atsuhiko Kobayashi, Tokyo (JP); Tsukasa Matsuzaki, Saitama (JP); Yuichi Nakabo, Saitama (JP)

(73) Assignee: SENQCIA CORPORATION (JP)

( * ) Notice: Subject to any disclaimer, the term of this patent is extended or adjusted under 35 U.S.C. 154(b) by 257 days.

(21) Appl. No.: 14/346,178

(22) PCT Filed: Sep. 18, 2013

(86) PCT No.: PCT/JP2013/075173
§ 371 (c)(1),
(2) Date: Mar. 20, 2014

(87) PCT Pub. No.: WO2015/040700
PCT Pub. Date: Mar. 26, 2015

(65) Prior Publication Data
US 2016/0153201 A1    Jun. 2, 2016

(51) Int. Cl.
*E04F 15/024* (2006.01)
*H02G 3/14* (2006.01)
(Continued)

(52) U.S. Cl.
CPC .......... *E04F 15/02405* (2013.01); *E04B 5/48* (2013.01); *H02G 3/14* (2013.01); *H02G 3/185* (2013.01); *E04F 15/024* (2013.01)

(58) Field of Classification Search
CPC ........ H02G 13/14; H02G 3/185; H02G 3/285; H02G 3/0418; H02G 3/081; H02G 9/025;
(Continued)

(56) References Cited

U.S. PATENT DOCUMENTS 5,162,612 A * 11/1992 Naka ..................... E04F 15/024
                                                      174/480
D441,719 S * 5/2001 Lew ........................... D13/152
(Continued)

FOREIGN PATENT DOCUMENTS

JP    2000240263 A    9/2000
JP    2003041753 A    2/2003
(Continued)

OTHER PUBLICATIONS

Machine translation of JP 2007-189805A, obtained from https://www4.j-platpat.inpit.go.jp/cgi-bin/tran_web_cgi_ejje?u=http://www4.j-platpat.inpit.go.jp/eng/translation/20160416012115681 1692235512985708544EC0670D903796E65DB289F40AD02A (last accessed on Apr. 15, 2016).*

*Primary Examiner* — Joshua J Michener
*Assistant Examiner* — Theodore Adamos
(74) *Attorney, Agent, or Firm* — Bacon & Thomas, PLLC (57) ABSTRACT

In a lid member having a long and short edge plate portions which are adjacent to each other, and approximately formed as an L-shaped form in its cross section, the long edge plate portion has a plurality of first groove portions which extend approximately in parallel to a ridge line portion which is held in common with the short edge plate portion adjacent in a width direction so as to be arranged side by side while being spaced from each other, and are formed so as to be concaved to a back side in a thickness direction in relation to an upper surface, and a plurality of second groove portions which are formed so as to be concaved to the back side in the thickness direction in relation to the upper surface, and are connected both end portions in a length direction respectively to a plurality of first groove portions.

5 Claims, 10 Drawing Sheets

(51) Int. Cl.
*H02G 3/18* (2006.01)
*E04B 5/48* (2006.01)

(58) Field of Classification Search
CPC .............. E04F 15/02504; E04F 15/024; E04F 15/02452; E04C 2/326; Y10T 428/24678; E04B 5/48
USPC ........... 52/29, 220.1–220.8, 126.7, 357, 360; 174/66, 65 R, 67, 488, 50.51
See application file for complete search history.

(56) References Cited

U.S. PATENT DOCUMENTS

| | | | | |
|---|---|---|---|---|
| 6,265,662 B1* | 7/2001 | Riedy | ................... | H02G 3/185 174/66 |
| 7,165,854 B1* | 1/2007 | Liu | ......................... | G02B 5/08 248/466 |
| 8,944,266 B2* | 2/2015 | Roemer | ......................... | 174/76 |
| 2009/0173513 A1* | 7/2009 | Petak | ...................... | H02G 1/00 174/66 |
| 2010/0146884 A1* | 6/2010 | Lu | ........................... | E04C 2/521 52/220.2 |
| 2011/0048759 A1* | 3/2011 | Korcz | ..................... | F21V 21/03 174/61 |
| 2011/0240361 A1* | 10/2011 | Bardia | ................. | H05K 5/0026 174/520 |
| 2012/0295065 A1* | 11/2012 | Shimizu | ................. | E04C 2/326 428/156 |
| 2013/0288069 A1* | 10/2013 | Takahashi | ............. | B21D 47/00 428/604 |

FOREIGN PATENT DOCUMENTS

| | | |
|---|---|---|
| JP | 2005232808 A | 9/2005 |
| JP | 2007189805 A | 7/2007 |

* cited by examiner

(Prior Art)

FIG. 9

(Prior Art)

FIG. 10

(Prior Art)

LID MEMBER AND FLOOR PANEL USING THE SAME

BACKGROUND OF THE INVENTION

Field of the Invention

The present invention relates to a lid member which is attached to an opening portion of a side portion of a floor panel for a free access floor, and the floor panel to which the lid member is attached.

Description of the Conventional Art

The floor panel is used in the free access floor, and is provided for forming a second floor surface so as to be spaced above a floor surface which constructs a part of a building construction.

Figure 8:
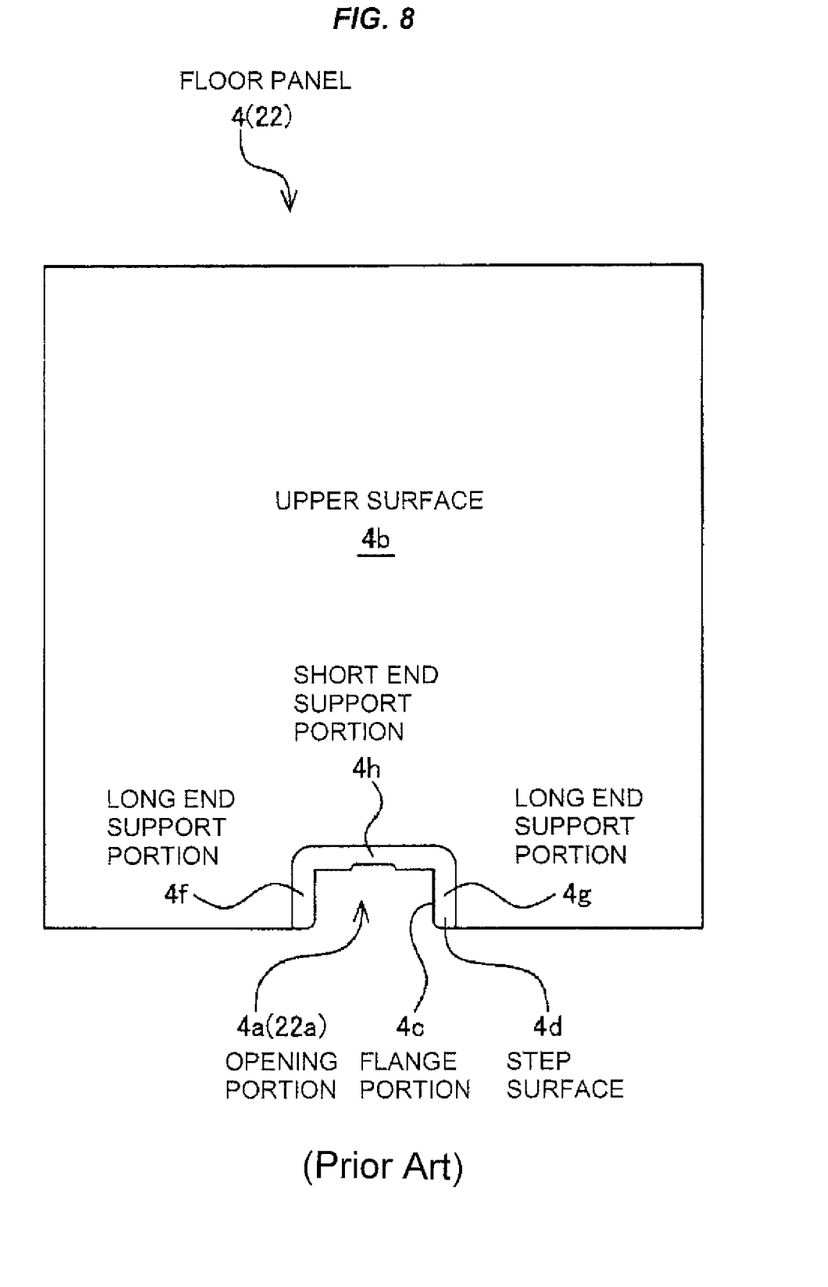
FIG. 8 is a view showing the floor panels 4 and 22 according to the conventional art and the first embodiment of the present invention, and is a top elevational view of a whole showing a state before the lid members 2 and 20 are attached to them.
Figure 9:
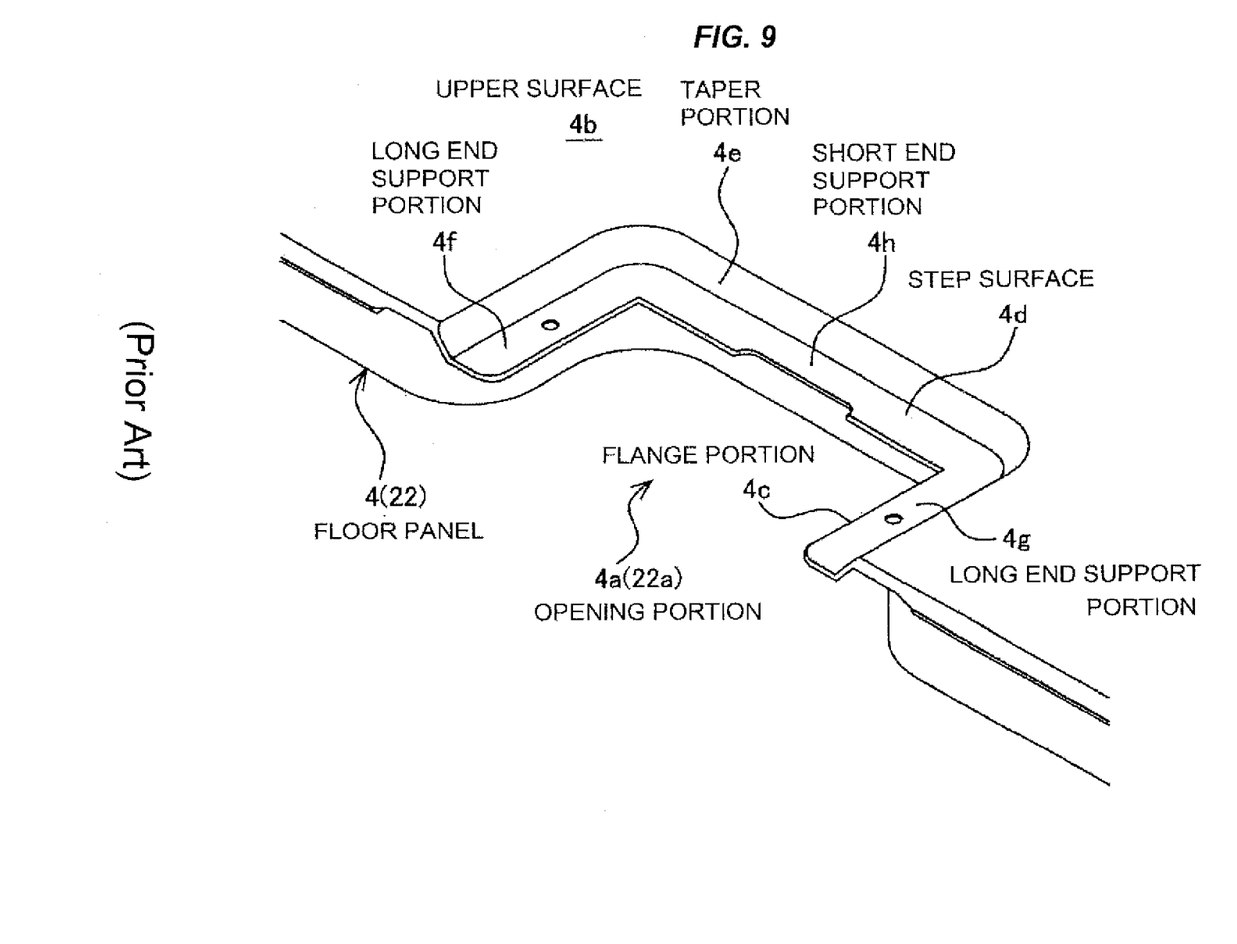
FIG. 9 is a partly enlarged perspective view showing the opening portions 4a and 22a of the floor panels 4 and 22 and the vicinity thereof in an enlarged manner before the lid members 2 and 20 are attached.
Figure 10:
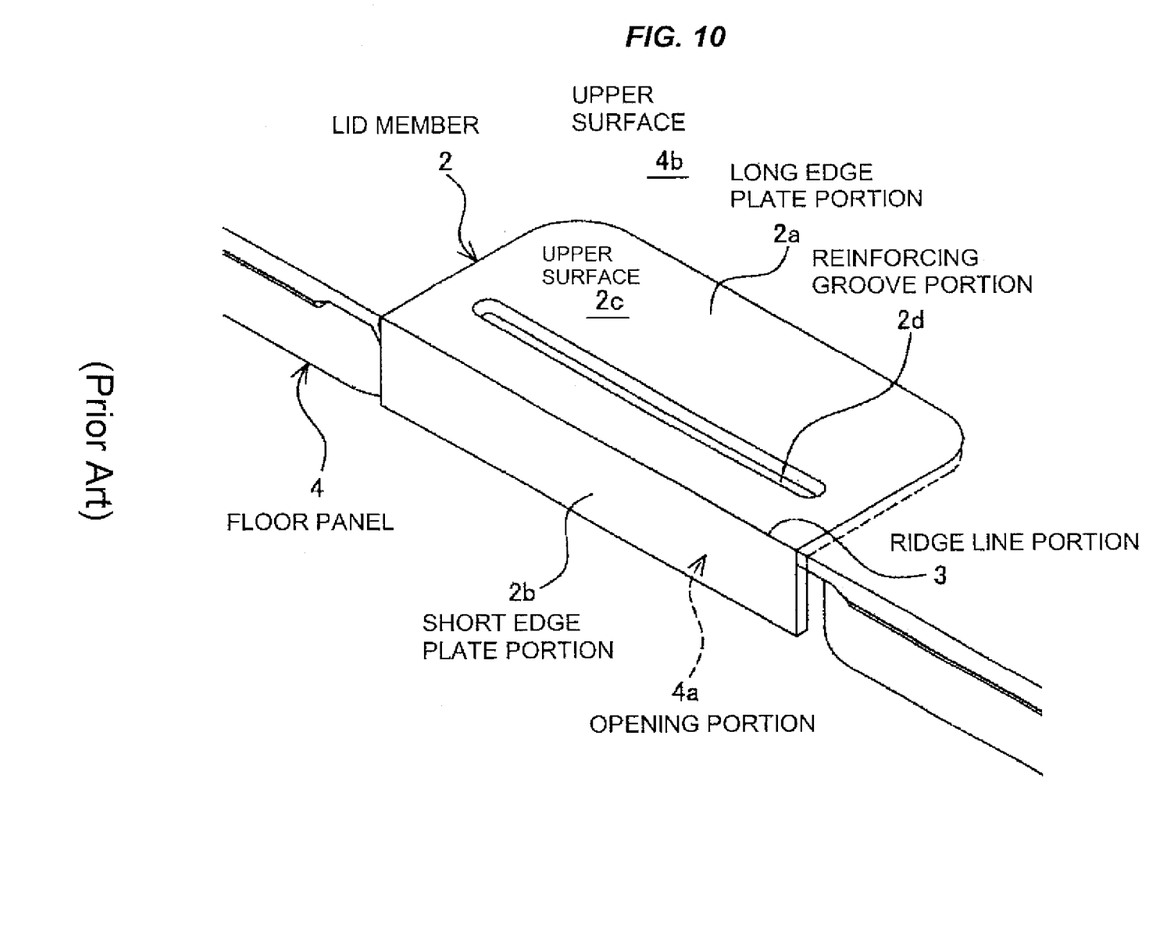
FIG. 10 is a perspective view showing the conventional lid member 2 and the vicinity of the opening portion 4a of the floor panel 4 using the lid member 2.

FIGS. 8 to 10 are views which are referred for describing a conventional lid member 2 and a floor panel 4 using the same.

As shown in FIG. 8, in the conventional floor panel 4, an opening portion 4a is formed in a side edge portion in a lower side of the drawing so as to pass through a wiring which is drawn out of the other device, the opening portion 4a being notched so as to intrude approximately like a rectangular shape toward an upward direction in the drawing.

As shown in FIG. 9, a taper portion 4e and a flange portion 4c are formed in three edge portions which construct the opening portion 4a of the floor panel 4 and are formed approximately as a C-shaped form, the taper portion 4e being folded downward from an upper surface 4b of the floor panel 4 and having a taper-like cross section, and the flange portion 4c being folded like a flange so as to protrude to a horizontally outer side from a lower end portion of the taper portion 4e and being formed approximately as a C-shaped form.

The flange portion 4c is structured such as to have long end support portions 4f and 4g which are opposed to each other and respectively support both end portions in a longitudinal direction of the lid member 2, and a short end support portion 4h which is connected in both end portions respectively to upper end portions in FIG. 8 of the long end support portions 4f and 4g, and supports an end portion in a short width direction of the lid member 2, and a horizontal step surface 4d is formed in an upper surface of the flange portion 4c at a height position which is one stage lower than the upper surface 4b of the floor panel 4.

Further, in the conventional floor panel 4, a whole of the opening portion 4a of the floor panel 4 can be closed by mounting a long edge plate portion 2a which is longer in a cross section of the lid member 2 formed as an L-shaped form in its section, as shown in FIG. 10, onto the step surface 4d of the flange portion 4c of the opening portion 4a, as shown in FIG. 9 (refer to patent document 1).

Further, only a part of the opening portion 4a of the floor panel 4 can be closed by changing a posture of the lid member 2 so as to mount a short edge plate portion 2b which is shorter in the L-shaped cross section of the lid member 2, in place of the long edge plate portion 2a, onto the step surface 4d of the flange portion 4c.

PRIOR ART DOCUMENT

Patent Document

Patent Document 1: Japanese Unexamined Patent Publication No. 2003-41753
Patent Document 2: Japanese Unexamined Patent Publication No. 2005-232808

SUMMARY OF THE INVENTION

Problem to be Solved by the Invention

However, since the lid member 2 used in the conventional floor panel 4 is structured such that a simple plate member is folded in an L-shaped form in its cross section, a strength thereof is not sufficient, and there is a problem that the lid member 2 may be deformed in the case that a great load is applied from the above.

Further, it is thought that the strength is improved by making a thickness of the lid member 2 larger for preventing the deformation of the lid member 2, however, a weight of the lid member 2 becomes heavier in this case, and an amount of the material required for manufacturing is increased so as to cause a cost increase. As a result, there is a problem that a weight increase and a cost increase of the lid member 2 are caused.

Further, in order to prevent the deformation of the lid member 2, a reinforcing groove portion 2d (a reinforcing bead) is press formed in the long edge plate portion 2a of the lid member 2, as shown in FIG. 10, the reinforcing groove portion 2d extending so as to be along a ridge line portion 3 which is held in common with the short plate portion 2b, and be concaved to a back side in a thickness direction in relation to an upper surface 2c (refer to patent document 2).

Further, according to the structure, the load applied from the above of the lid member 2 is concentrically transmitted to the long end support portions 4f and 4g (refer to FIG. 9) opposed to each other among the C-shaped flange portion 4c of the opening portion 4a of the floor panel 4.

However, in the lid member 2, even in the case that the reinforcing groove portion 2d mentioned above is formed in the long edge plate portion 2a, it is impossible to sufficiently improve the strength of the lid member 2. There is a problem that the lid member 2 may be deformed in the case that the great load is applied from the above.

Accordingly, the present invention is made by taking the problem mentioned above into consideration, and an object of the present invention is to provide a lid member which can prevent the lid member from being deformed in the case that the lid member is mounted to an opening portion of a floor panel and is applied a great load from the above by improving a strength of the lid member, and can prevent a thickness of the lid member from being excessively increased, and the floor panel using the lid member.

Means for Solving the Problem

In order to achieve the object mentioned above, according to the present invention, there is provided a lid member comprising:

a long edge plate portion;
a short edge plate portion;
the long edge plate portion and the short edge plate portion being adjacent to each other; and
the lid member being approximately formed as an L-shaped form in its cross section,
wherein the long edge plate portion has a plurality of first groove portions which extend approximately in parallel to a ridge line portion which is held in common with the short edge plate portion adjacent in a width direction so as to be arranged side by side while being spaced from each other, and are formed so as to be concaved to a back side in a thickness direction in relation to an upper surface, and a plurality of second groove portions which are formed so as to be concaved to the back side in the thickness direction in relation to the upper surface, and are connected both end portions in a length direction respectively to a plurality of first groove portions.

Further, according to the present invention, there is provided the lid member, wherein a plurality of second groove portions are set in their length direction so that an angle from the ridge line portion has a smaller incline in the groove portions arranged closer to both end portions in the length direction of the long edge plate portions than in the groove portions arranged closer to the center portion in the length direction of the long edge plate portions.

Further, according to the present invention, there is provided the lid member, wherein the short edge plate portion has a third groove portion which extends approximately in a parallel direction to the ridge line portion which is held in common with the long edge plate portion, and is formed so as to be concaved to a back side in a thickness direction of the short edge plate portion in relation to an outer surface.

Further, according to the present invention, there is provided the lid member, wherein the short edge plate portion has a fourth groove portion which extends approximately in a vertical direction to the ridge line portion which is held in common with the long edge plate portion, and is formed so as to be concaved to a back side in a thickness direction of the short edge plate portion in relation to an outer surface.

Further, in order to achieve the object mentioned above, according to the present invention, there is provided a floor panel comprising:

an opening portion; and a lid member which is attached to the opening portion, wherein the lid member is provided with a long edge plate portion and a short edge plate portion which are adjacent to each other, and is approximately formed as an L-shaped form in its cross section, wherein the long edge plate portion has a plurality of first groove portions which extend approximately in parallel to a ridge line portion which is held in common with the short edge plate portion adjacent in a width direction so as to be arranged side by side while being spaced from each other, and are formed so as to be concaved to a back side in a thickness direction in relation to an upper surface, and a plurality of second groove portions which are formed so as to be concaved to the back side in the thickness direction in relation to the upper surface, and are connected both end portions in a length direction respectively to a plurality of first groove portions.

Effect of the Invention

According to the lid member of the present invention as mentioned above, in the lid member provided with the long edge plate portion, and the short edge plate portion which are adjacent to each other, and approximately formed as the L-shaped form in its cross section, the long edge plate portion has a plurality of first groove portions which extend approximately in parallel to the ridge line portion which is held in common with the short edge plate portion adjacent in the width direction so as to be arranged side by side while being spaced from each other, and are formed so as to be concaved to the back side in the thickness direction in relation to the upper surface, and a plurality of second groove portions which are formed so as to be concaved to the back side in the thickness direction in relation to the upper surface, and are connected both end portions in the length direction respectively to a plurality of first groove portions. Accordingly, it is possible to prevent the lid member from being deformed in the case that the lid member is mounted to the opening portion of the floor panel and is applied the great load from the above, by improving the strength of the lid member, and it is possible to prevent the thickness thereof from being excessively increased.

Further, according to the floor panel of the present invention, in the floor panel having the opening portion, and the lid member which is attached to the opening portion, the lid member is provided with the long edge plate portion and the short edge plate portion which are adjacent to each other, and is approximately formed as the L-shaped form in its cross section, and the long edge plate portion has a plurality of first groove portions which extend approximately in parallel to the ridge line portion which is held in common with the short edge plate portion adjacent in the width direction so as to be arranged side by side while being spaced from each other, and are formed so as to be concaved to the back side in the thickness direction in relation to the upper surface, and a plurality of second groove portions which are formed so as to be concaved to the back side in the thickness direction in relation to the upper surface, and are connected both end portions in the length direction respectively to a plurality of first groove portions. Accordingly, it is possible to prevent the lid member from being deformed in the case that the lid member is mounted to the opening portion of the floor panel and is applied the great load from the above, by improving the strength of the lid member, and it is possible to prevent the thickness thereof from being excessively increased.

DESCRIPTION OF REFERENCE NUMERALS 2 lid member
2a long edge plate portion
2b short edge plate portion
2c upper surface
2d reinforcing groove portion
3 ridge line portion
4 floor panel
4a opening portion
4b upper surface
4c flange portion
4d step surface
4e taper portion
4f, 4g long end support portion
4h short end support portion
20 lid member
22 floor panel
22a opening portion
24 long edge plate portion
24a upper surface
24b first groove portion
24c second groove portion
24d groove bottom surface
24e taper portion
24f locking portion
25 ridge line portion
26 short edge plate portion
26a outer surface
26b folded portion
26c third groove portion
26d groove bottom surface
26e taper portion
40 lid member
42 floor panel
44 long edge plate portion
44a upper surface
44b first groove portion
44c second groove portion
44d groove bottom surface
44e taper portion
44f locking portion
45 ridge line portion
46 short edge plate portion
46a outer surface
46b folded portion
46c third groove portion
46d groove bottom surface
46e taper portion
46f fourth groove portion
46g groove bottom surface
46h taper portion
48 wiring

DETAILED DESCRIPTION OF PREFERRED EMBODIMENTS

A description will be specifically given of modes for carrying out a lid member according to the present invention and a floor panel using the same with reference to the accompanying drawings.

FIGS. 1 to 5, 8 and 9 are views which are referred for describing a lid member 20 according to a first embodiment of the present invention and a floor panel 22 using the lid member.

Figure 1:
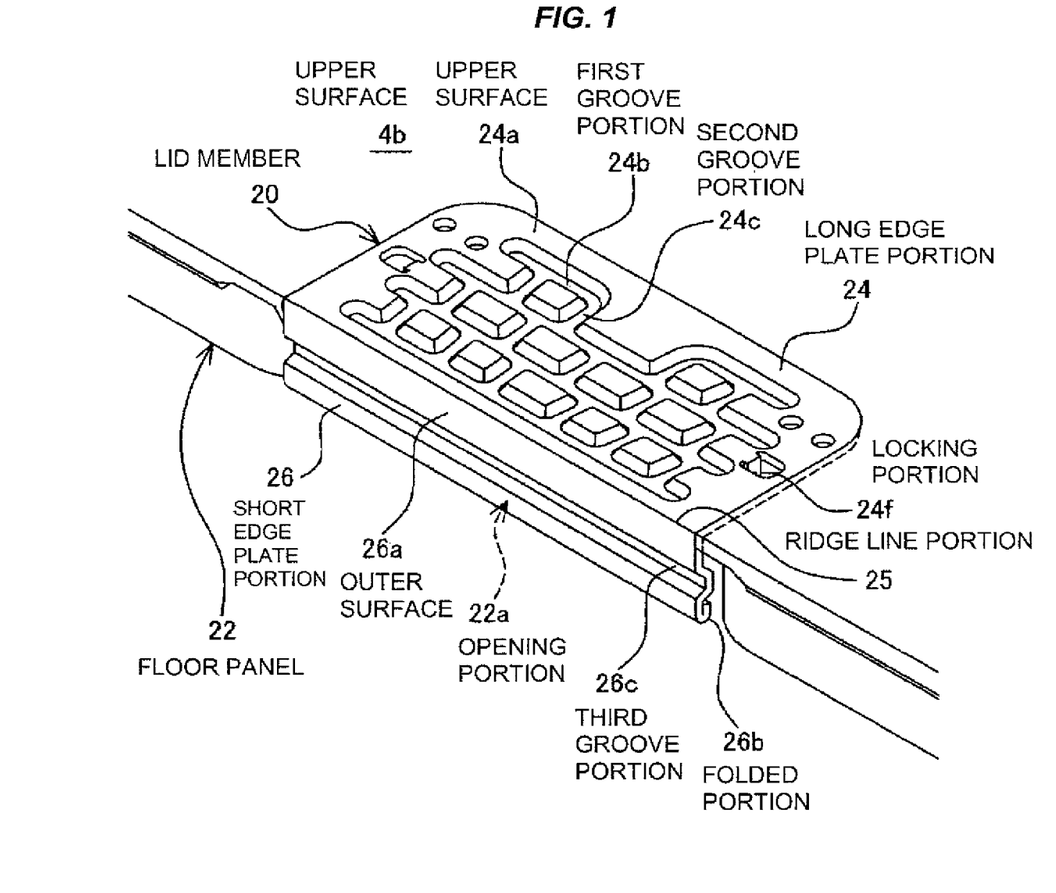
FIG. 1 is a view showing a lid member 20 according to a first embodiment of the present invention and a floor panel 22 using the lid member, and is a perspective view showing the lid member 20 and an opening portion 22a of a floor panel 22.

The floor panel 22 according to the present embodiment is significantly different from the conventional floor panel 4 in a point that the lid member 20 as shown in FIG. 1 is provided in place of the lid member 2 in the conventional floor panel 4.

Further, the floor panel 22 according to the present embodiment has absolutely the same shape and structure as those of the floor panel 4 to which the conventional lid member 2 is not attached, as shown in FIGS. 8 and 9, in a state in which the lid member 20 is not attached to the floor panel 22.

In other words, the floor panel 22 is formed an opening portion 22a which is notched so as to intrude approximately as a rectangular shape toward an upper side in the drawing, in a side edge portion in a lower side of the drawing, in the same manner as the conventional floor panel 4 shown in FIG. 8.

Further, as shown in FIG. 9, a taper portion 4e and a flange portion 4c are formed in three edge portions formed as a C-shaped form and constructing the opening portion 22a, the taper portion 4e being folded downward from the upper surface 4b of the floor panel 22 and having a tapered cross section, and the flange portion 4c being folded like a flange so as to protrude out of a lower end portion of the taper portion 4c to a horizontally outer side and being formed approximately as a C-shaped form in a top elevational view.

The flange portion 4c is structured, as shown in FIG. 8, such as to have the long end support portions 4f and 4g which are opposed to each other, and the short end support portion 4h which is connected in both end portions respectively to the upper end portions in FIG. 8 of the long end support portions 4f and 4g, in the same manner as the description of the prior art, and the horizontal step surface 4d is formed in the upper surface of the flange portion 4c at the height position which is one stage lower than the upper surface 4b of the floor panel 22.

The lid member 20 according to the present embodiment is constructed by a horizontal long edge plate portion 24 and a vertical short edge plate portion 26 as shown in FIG. 1, and is structured such as to close the opening portion 22a of the floor panel 22 by being horizontally mounted onto the step surface 4d of the flange portion 4c in the opening portion 22a of the floor panel 22 as shown in FIG. 9 so that the long edge plate portion 24 comes to an upper side.

Figure 4:
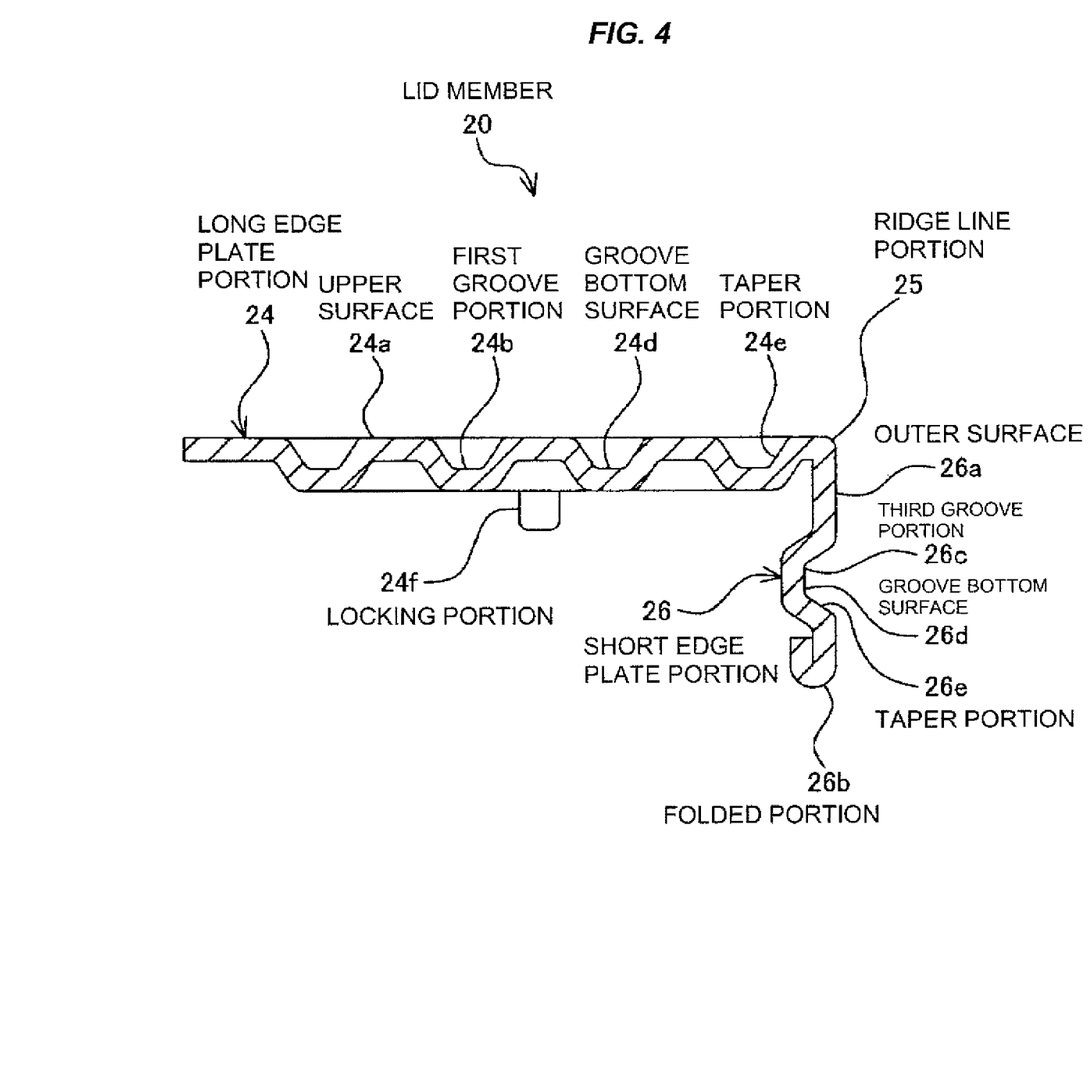
FIG. 4 is a cross sectional view of the lid member 20 in FIG. 2 as seen from an arrow A-A.

The lid member 20 is structured, as shown in FIGS. 1 and 4, such that each of the long edge plate portion 24 and the short edge plate portion 26 is formed approximately as a rectangular plate-like form, and the long edge plate portion 24 and the short edge plate portion 26 have a ridge line portion 25 in common with each other and are arranged adjacently, and a vertical cross section of the lid member 20 is formed as an L-shaped form.

Figure 2:
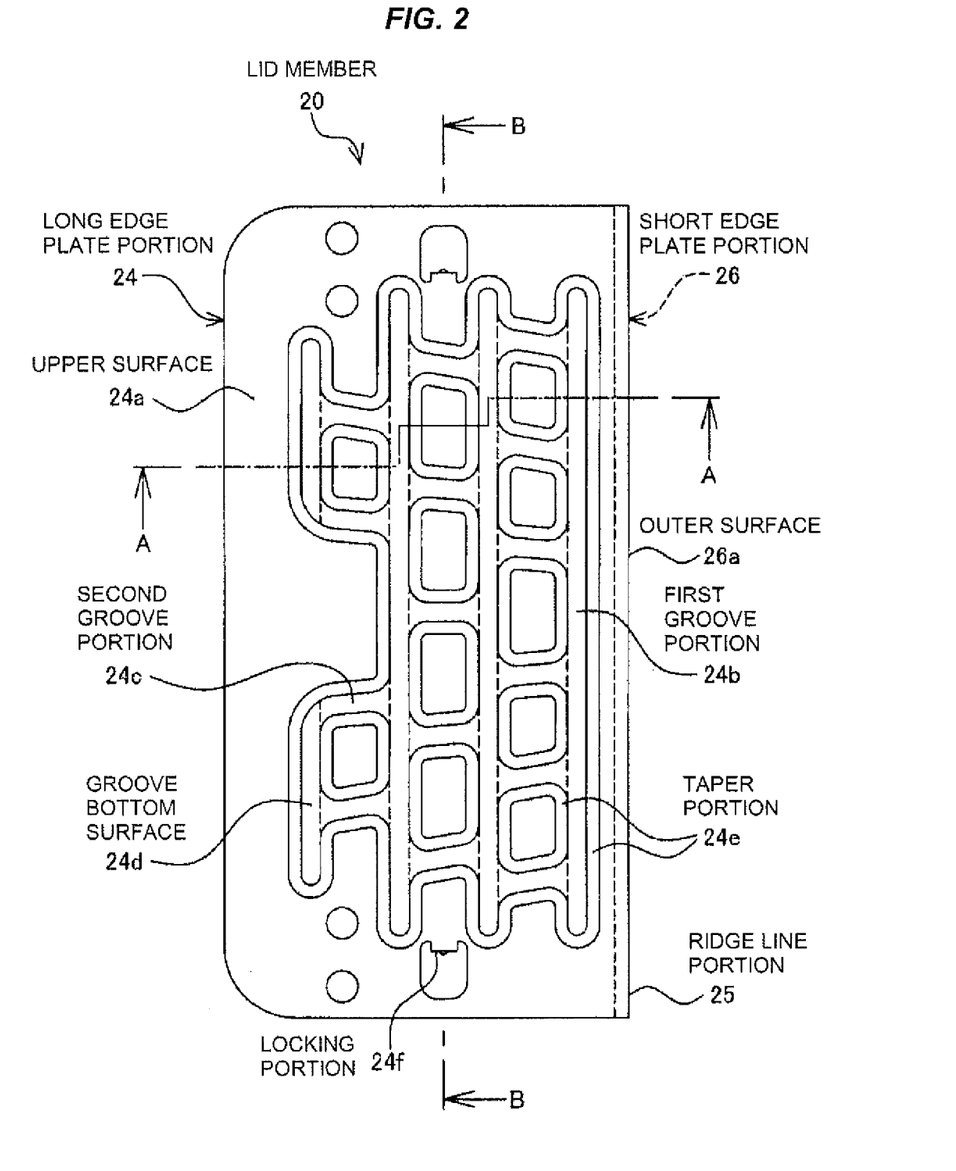
FIG. 2 is a top elevational view of the lid member 20 in FIG. 1 as seen from an upper surface 24a side of a long edge plate portion 24.

In the long edge plate portion 24 of the lid member 20, as shown in FIG. 2, five first groove portions 24b extending in its length direction (a vertical direction of the drawing) are formed by a drawing process using a pressing device, so that the first groove portions 24b are approximately parallel to the ridge line portion 25 which is held in common with the short edge plate portion 26.

In FIG. 2, as a matter of convenience for description, five first groove portions 24b extending in the vertical direction of the drawing and fifteen second groove portions 24c extending in a lateral direction of the drawing are described so as to be sectioned part by part with a broken line, however, any boundary line sectioning them does not actually exist, and they are continuously formed as a whole, as shown in FIG. 1.

Five first groove portions 24b formed in the long edge plate portion 24 of the lid member 20 are arranged side by side so as to be spaced from each other. Further, among five first groove portions 24b, two first groove portions 24b in a left side in FIG. 2 are shorter than three first groove portions 24b in a right side in FIG. 2, and are arranged in series so as to be spaced from each other in a vertical direction in FIG. 2.

As shown in FIG. 4, each of five first groove portions 24b formed in the long edge plate portion 24 of the lid member 20 is formed so as to be concaved downward in the drawing by being pressed down according to a press drawing process in relation to the upper surface 24a, and is formed a horizontal groove bottom surface 24d at a height position which is one stage lower than the upper surface 24a, and a taper portion 24e which connects the upper surface 24a and the groove bottom surface 24d and is formed as a taper shape in its cross section.

Further, in the long edge plate portion 24 of the lid member 20, as shown in FIG. 2, fifteen second groove portions 24c mainly extending in the lateral direction of the drawing are formed by the press drawing process so as to be arranged between the first groove portions 24b and 24b which are adjacent to each other, and be inclined perpendicularly or at an optional angle in relation to the ridge line portion 25 which is held in common with the short edge plate portion 26.

Fifteen second groove portions 24c formed in the long edge plate portion 24 of the lid member 20 are arranged side by side so as to be spaced from each other in the vertical and lateral directions of the drawing. Further, fifteen second groove portions 24c are arranged so as to be inclined more saliently in relation to the ridge line portion 25 in the case that they are arranged closer to both end portions in the longitudinal direction of the long edge plate portion 24 (the vertical direction of the drawing) than in the case that they are arranged closer to the center portion in the length direction.

In other words, as shown in FIG. 2, among fifteen second groove portions 24c of the long edge plate portion 24 of the lid member 20, one second groove portion 24c arranged in the center portion in the length direction of the long edge plate portion 24 (the vertical direction of the drawing) is arranged perpendicularly in relation to the ridge line portion 25.

Further, seven second groove portions 24c arranged in an upper side of the drawing than one second groove portion 24c arranged in the center portion are arranged so as to be inclined so that a left end portion in the drawing is inclined upward in comparison with a right end portion, and are arranged so as to be inclined at a smaller acute angle in the portion closer to the upper end portion of the drawing than the portion farther from the upper end portion of the drawing.

In the same manner, seven second groove portions 24c arranged in a lower side of the drawing than one second groove portion 24c arranged in the center portion are arranged so as to be inclined so that a left end portion in the drawing is inclined downward in comparison with a right end portion, and are arranged so as to be inclined at a smaller acute angle in the portion closer to the lower end portion of the drawing than the portion farther from the lower end portion of the drawing.

Further, as shown in FIG. 2, in the second groove portion 24c of the long edge plate portion 24, one end portion in its length direction is connected to a length midstream portion of the first groove portion 24c, and the other end portion in its length direction is connected to a length midstream portion of the other first groove portion 24c.

Further, each of fifteen second groove portions 24c of the long edge plate portion 24 is structured such that its connection portion is connected approximately like a T-shaped form to the first groove portion 24c to which both end portions in the length direction are connected, and the connection portion is not connected approximately like a cross-shaped form. In other words, each of the second groove portions 24c is arranged so as to be deviated from each other in a vertical direction in FIG. 2 so that one end portion in the length direction does not connect to one end portion of the other second groove portion 24c while holding the first groove portion 24b therebetween.

Figure 5:
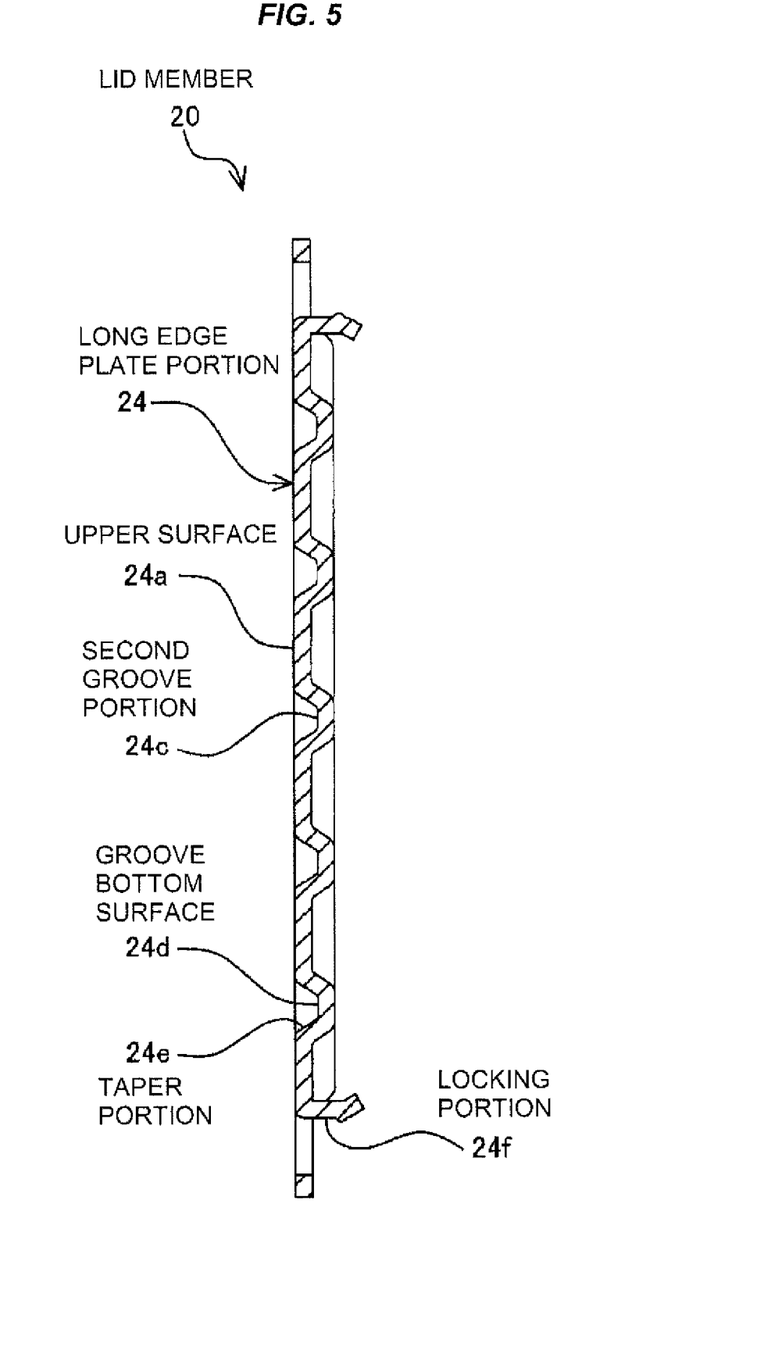
FIG. 5 is a cross sectional view of the lid member 20 in FIG. 2 as seen from an arrow B-B.

As shown in FIG. 5, each of fifteen second groove portions 24c formed in the long edge plate portion 24 of the lid member 20 is formed so as to be concaved rightward in the drawing by being pressed down according to the press drawing process in relation to the upper surface 24a in the same manner as the first groove portion 24b, and is formed a horizontal groove bottom surface 24d at a height position which is one stage lower than the upper surface 24a, and a taper portion 24e which connects the upper surface 24a and the groove bottom surface 24d and is formed as a taper shape in its cross section.

Further, each of the second groove portions 24c is connected like the same plane shape so that the height position of its groove bottom surface 24d is aligned with the height position of the groove bottom surface 24d formed in the first groove portion 24b.

Further, in the long edge plate portion 24 of the lid member 20, as shown in FIGS. 2 and 5, a locking portion 24f folded approximately perpendicularly toward a lower side (a back side of the paper surface in FIG. 2 and a right side of the paper surface in FIG. 5) is formed in each of both end portions in its length direction (a vertical direction of the drawing).

The locking portion 24f is structured such as to be engaged with the flange portion 4c in the case that the lid member 20 is mounted onto the flange portion 4c of the opening portion 22a of the floor panel 22. As a result, it is possible to prevent the lid member 20 from being easily detached from the flange portion 4c of the floor panel 22.

Next, in the short edge plate portion 26 of the lid member 20, a folded portion 26b in which a leading end portion is folded as a U-shaped form in a clockwise direction in the drawing is formed in a lower end portion in an opposite side in a width direction (a vertical direction of the drawing) to the ridge line portion 25 which is held in common with the long edge plate portion 24, as shown in FIG. 4.

Since the folded portion 26b is formed in the short edge plate portion 26 of the lid member 20 as mentioned above, and a horizontal cross sectional area of the folded portion 26b is formed largely, the short edge plate portion 26 is reinforced so as to be hard to be deformed.

Figure 3:
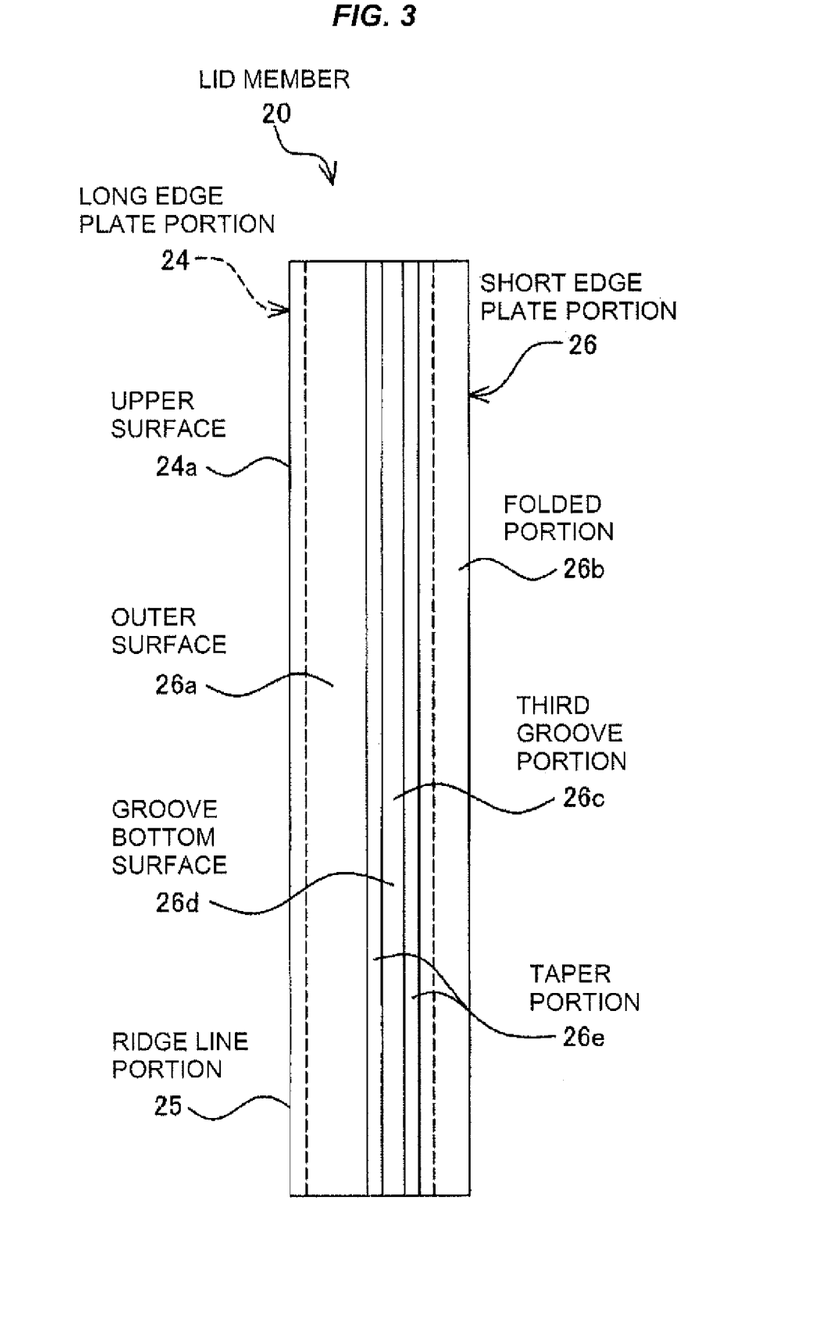
FIG. 3 is a side elevational view of the lid member 20 in FIG. 1 as seen from an outer surface 26a of a short edge plate portion 26.

Further, in the short edge plate portion 26 of the lid member 20, as shown in FIG. 3, one third groove portion 26c extending over both end portions in its length direction (a vertical direction of the drawing) is formed in the center portion in a width direction (a lateral direction of the drawing) by a drawing process using a pressing device.

As shown in FIG. 4, one third groove portion 26c formed in the short edge plate portion 26 of the lid member 20 is pressed down by the press drawing process in relation to the outer surface 26a and is formed so as to be concaved to an inner side in a thickness direction (a left direction of the drawing), a groove bottom surface 26d which is horizontal to the outer surface 26a is formed at a height position which is one stage lower than the outer surface 26a, and a taper portion 26e having a taper-shaped cross section is formed so as to connect the outer surface 26a and the groove bottom surface 26d.

The lid member 20 according to the present embodiment can enlarge its surface rigidity since each of the first groove portions 24b and the second groove portions 24c is formed in the long edge plate portion 24. Therefore, it is possible to improve the strength of the first lid member 22 in relation to the load applied from the above.

In other words, the lid member 2 according to the conventional embodiment is structured such as to concentrically transmit the load applied from the upper side of the lid member 2 to the long end support portions 4f and 4g (refer to FIG. 9) opposing to each other in the C-shaped flange portion 4c in the opening portion 4a of the floor panel 4, by forming the reinforcing groove portion 2d which extends so as to be along the ridge line portion 3 which is held in common with the short edge plate portion 2b and is concaved in the thickness direction in relation to the upper surface 2c, in the long plate portion 2a, as shown in FIG. 10.

On the contrary, since the lid member 20 according to the present embodiment is formed in the long edge plate portion 24 five first groove portions 24b extending approximately in parallel to the ridge line portion 25 which is held in common with the short edge plate portion 26, and fifteen second groove portions 24c extending so as to be inclined vertically or at the acute angle in relation to the ridge line portion 25, as shown in FIG. 2, it is possible to transmit the load applied from the upper side of the lid member 20 in a dispersing manner to the long end support portions 4f and 4g and the short end support portion 4h of the C-shaped flange portion 4c in the opening portion 22a of the floor panel 22.

Further, each of fifteen second groove portions 24c in the lid member 20 according to the present embodiment is structured such that the length direction is set so as to be inclined at the smaller angle from the ridge line portion 25 in the groove portion which is arranged closer to both end portions in the length direction of the long edge plate portion 24 than in the groove portion which is arranged closer to the center portion in the length direction of the long edge plate portion 24. Therefore, it is possible to transmit the load applied from the upper side of the lid member 20 in a dispersing manner to the connection portion between the long end support portion 4f and the short end support portion 4h of the C-shaped flange portion 4c, and the connection portion between the long end support portion 4g and the short end support portion 4h in the opening portion 22a of the floor panel 22.

Further, each of fifteen second groove portions 24c in the lid member 20 according to the present embodiment is arranged so as to be deviated from each other in the length direction of the first groove portion, so that one end portion in the length direction thereof is not connected to one end portion of the other second groove portion 24c while holding the first groove portion 24b therebetween. Therefore, it is possible to prevent the load applied from the upper side of the lid member 20 from being transmitted concentrically to the short end support portion 4h of the C-shaped flange portion 4c in the opening portion 22a of the floor panel 22.

Accordingly, since the lid member 20 according to the present embodiment can effectively transmit the load applied from the upper side of the lid member 20 in a dispersing manner to each of the long end support portions 4f and 4g and the short end support portion 4h which correspond to three edges constructing the flange portion 4c, in the case that the lid member 20 is mounted on the flange portion 4c of the floor panel 22. Therefore, it is possible to improve a strength (a surface rigidity) of the lid member 20 against the load applied from the upper side.

Further, since the lid member 20 according to the present embodiment is structured such that the third groove portion 26c is formed in the short edge plate portion 26 and the taper portions 26e are formed in both sides of the third groove portion 26c, the lid member 20 is formed so that the short edge plate portion 26 is enlarged its length direction and its vertical cross sectional area. Therefore, since it is possible to enlarge the rigidity, it is possible to improve the strength of the lid member 20 against the load applied from the upper side.

By attaching the lid member 20 to the opening portion 22a of the floor panel 22, it is possible to improve a load resisting strength of the free access floor which is constructed by the floor panel 22.

Further, on the basis of the lid member 20 according to the present embodiment and the floor panel 22 using the same, since it is possible to improve the strength of the lid member 20 against the load applied from the upper side in the case that the lid member 20 is mounted to the opening portion 22a of the floor panel 22, it is possible to prevent the lid member 20 from being deformed by the load, and it is unnecessary to enlarge the thickness of the lid member 20. As a result, it is possible to prevent the thickness from being excessively increased.

As described above, on the basis of the lid member 20 according to the present embodiment and the floor panel 22 using the same, it is possible to prevent the lid member 20 from being deformed in the case that the lid member is mounted to the opening portion 22a of the floor panel 22 and the great load is applied from the upper side, by improving the strength of the lid member 20, and it is possible to prevent the thickness from being excessively increased.

Figure 6:
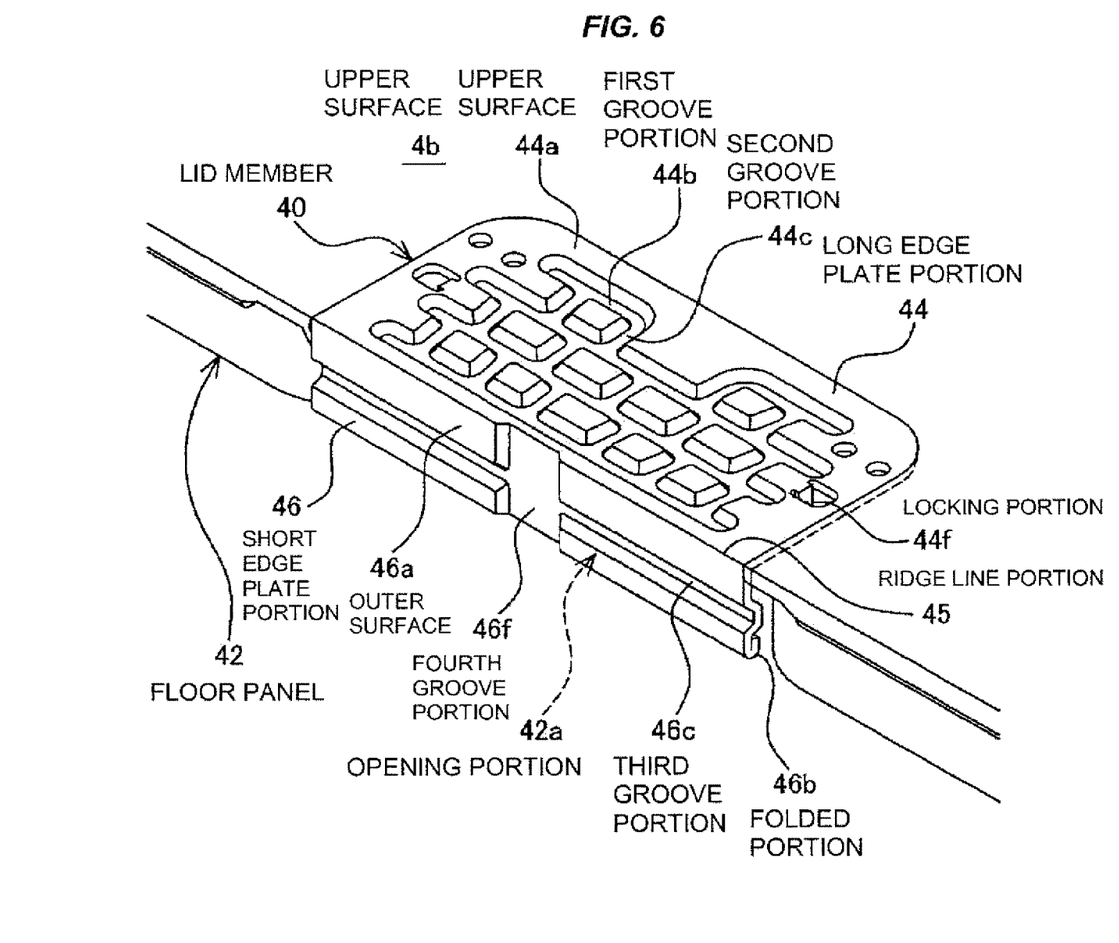
FIG. 6 is a view showing a lid member 50 according to a second embodiment of the present invention and a floor panel 42 using the lid member, and is a perspective view showing the lid member 40 and an opening portion 22a of a floor panel 42.
Figure 7:
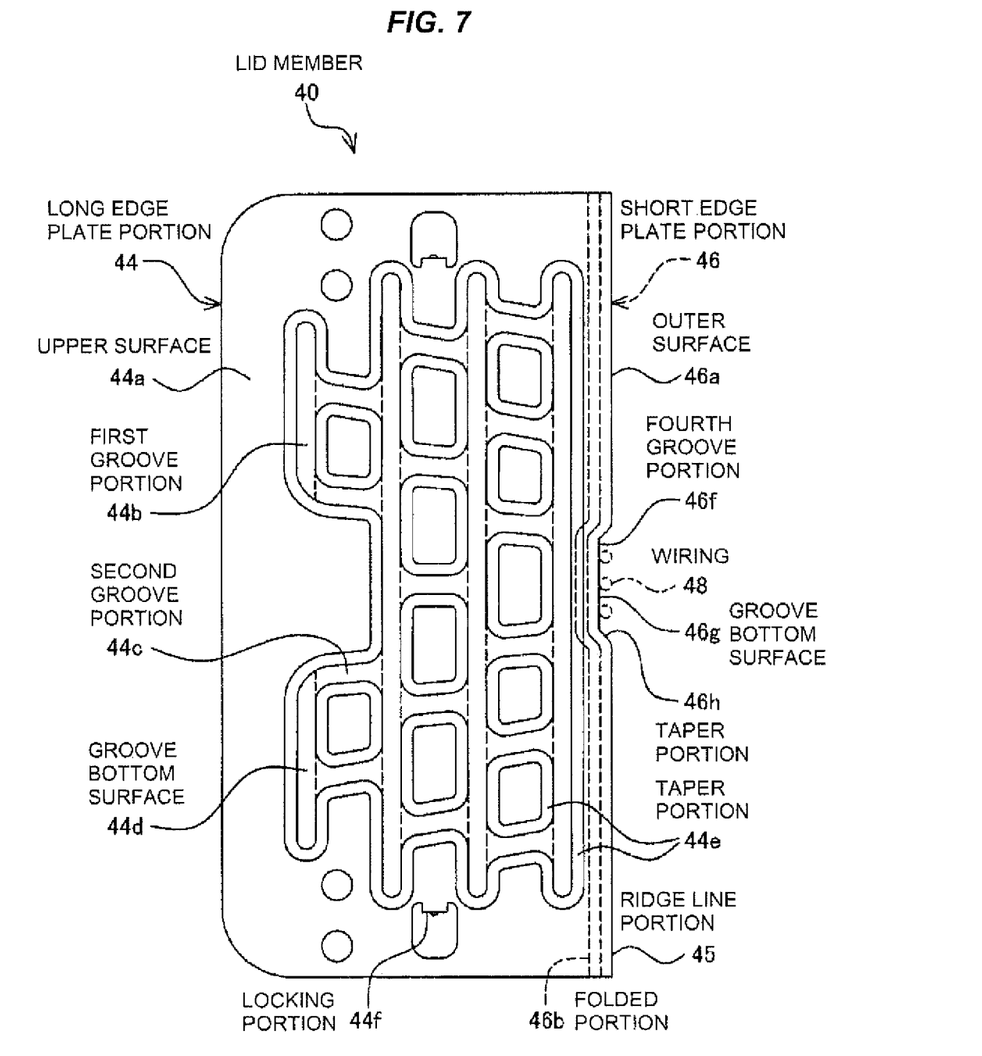
FIG. 7 is a top elevational view of the lid member 40 in FIG. 6 as seen from an upper surface 44a side of a long edge plate portion 44.

FIGS. 6 and 7 are views which are referred for describing a lid member 40 according to a second embodiment and a floor panel 42 using the same.

The lid member 40 according to the present embodiment is different from the lid member 20 according to the first embodiment mentioned above in a point that one fourth groove portion 46f extending over both end portions in a width direction (a vertical direction of the drawing) is formed in a center portion in a length direction of a short edge plate portion 46 according to a drawing process using a pressing device, as shown in FIG. 6, however, a first groove portion 44b, a second groove portion 44c and a locking portion 44f of a long edge plate portion 44, and a folded portion 46b of the short edge plate portion 46 are the same as the first groove portion 24b, the second groove portion 24c and the locking portion 24f of the long edge plate portion 24 and the folded portion 26b of the short edge plate portion 26.

As shown in FIG. 7, one fourth groove portion 46f formed in the short edge plate portion 46 of the lid member 40 is formed so as to be concaved to an inner side in a thickness direction (a left direction of the drawing) by being pressed down according to a press drawing process in relation to an outer surface 46a thereof, and is formed a groove bottom surface 46g which is horizontal to the outer surface 46a, at a height position which is one stage lower than the outer surface 46a, and a taper portion 46h which connects the outer surface 46a and the groove bottom surface 46g and is formed as a taper shape in its cross section.

Further, the fourth groove portion 46f of the short edge plate portion 46 is structured, as shown in FIG. 6, such that one end portion of third groove portions 46c which are segmentalized into two sections by the fourth groove portion 46 is connected to its length midstream portion.

The lid member 40 according to the present embodiment is structured, as shown in FIG. 6, such as to close the opening portion 42a of the floor panel 42 by being mounted onto the step surface 4d of the flange portion 4c in the opening portion 42a of the floor panel 42 so that the long edge plate portion 44 is directed upward, in the same manner as the lid member 20 according to the first embodiment shown in FIG. 1.

On the basis of the lid member 40 according to the present embodiment mentioned above and the floor panel 42 using the same, it is possible to prevent the lid member 40 from being deformed in the case that the lid member 40 is mounted to the opening portion 42a of the floor panel 42 and the great load is applied from the upper side, by improving the strength of the lid member 40, in the same manner as the lid member 20 according to the first embodiment and the floor panel 22 using the same, and it is possible to prevent the thickness from being excessively increased.

Further, on the basis of the lid member 40 according to the present embodiment and the floor panel 42 using the same, a wiring 48 can be passed to a gap which is generated by forming the fourth groove portion 46f of the lid member 40, as shown in FIG. 7.

The present invention is not limited only to the embodiments mentioned above, but can be variously modified with regard to the lid member and the floor panel using the same, within a range which can achieve the object of the present invention.

For example, the lid member 20 according to the first embodiment is structured such that four first groove portions 24b and fifteen second groove portions 24c are formed in the long edge plate portion 24, however, the numbers of the first groove portion and the second groove portion 24 are not limited to these numbers, but may be formed respectively two or more.

Further, the lid member 20 according to the first embodiment is structured such that one third groove portion 26c is formed in the short edge plate portion 26, however, two or more third groove portions may be formed. In this regard, same applies to the third groove portion 46c and the fourth groove portion 46f in the second embodiment mentioned above.

Further, the floor panel 22 according to the first embodiment is formed in the side edge portion one opening portion 22a which is notched so as to intrude approximately in the rectangular shape, however, a plurality of opening portions may be formed in the floor panel, and the lid member may be mounted to each of the opening portions. In this regard, same applies to the floor panel 42 according to the second embodiment mentioned above.

Further, in the case that two floor panels 42 which are adjacent to each other are arranged so that the respective opening portions 42a face to each other, and the lid member 40 is mounted to each of them, a wiring having a larger diameter than the wiring 48 shown in FIG. 7 can be passed to a large gap which is generated by the fourth groove portions 46f of two lid members 40.

Further, the floor panel 22 according to the first embodiment is structured such that the taper portion 4e having the taper-shaped cross section is formed between the plate portion having the upper surface 4b and the flange portion 4c, however, the taper portion 4e is not necessarily formed. In other words, it is possible to employ a plate portion which connects the plate portion having the upper surface 4b of the floor panel 22 and the flange portion 4c and is formed as a circular arc shape in a vertical cross section, in place of the taper portion 4e, or a plate-like plate portion only extending in a vertical direction may be formed.

In this regard, same applies to the first groove portion 24b, the second groove portion 24c and the third groove portion 26c of the lid member 20 according to the first embodiment, and the first groove portion 44b, the second groove portion 44c, the third groove portion 46c and the fourth groove portion 46f of the lid member 40 according to the second embodiment, it is possible to employ a plate portion which is formed as a circular arc shape in a vertical cross section, or a plate-like plate portion only extending in a vertical direction, in place of the taper portion.

What is claimed is:

1. A lid member comprising:
   a first plate portion having a predetermined thickness, and having a first surface defining an upper surface of the lid member and a second surface opposite to the first surface;
   a second plate portion having a predetermined thickness, and having a third surface defining a side surface of the lid member and a fourth surface opposite to the third surface;
   the first plate portion and the second plate portion being adjacent to each other; and
   the lid member being approximately formed as an L-shaped form in cross section,
   said first surface being substantially perpendicularly in relation to the third surface, and said first surface being contiguous to the third surface,
   said second surface being substantially perpendicularly in relation to the fourth surface, and said second surface being contiguous to the fourth surface,
   said first and second plate portions having a ridge line portion at a boundary of said first and third surfaces,
   length directions of the first and second plate portions being in parallel to a length direction of the ridge line portion, and
   wherein said first plate portion has a plurality of first groove portions which extend approximately in parallel to said ridge line portion so as to be arranged side by side while being spaced from each other, and
   said plurality of first groove portions are formed so as to be concaved to said second surface side in relation to the first surface, and
   wherein said first plate portion has a plurality of second groove portions which are formed so as to be concaved to said second surface side in relation to the first surface,
   said plurality of second groove portions being connected at both end portions in a length direction respectively to said plurality of first groove portions,
   a height position of a groove bottom surface of the first groove portions being aligned with a height position of a groove bottom surface of the second groove portions, and
   wherein said plurality of second groove portions contain a first group of groove portions arranged closer to both ends portions in the length direction of said first plate portion and a second group of groove portions arranged closer to a center position in the length direction of said first plate portion, and wherein the first group of groove portions and the second group of groove portions are set in respective length directions so that an angle from said ridge line portion has a smaller incline in the first group of groove portions than in the second group of groove portions.

2. The lid member according to claim 1,
wherein said second plate portion has a third groove portion which extends approximately in a parallel direction to the ridge line portion,
and is formed so as to be concaved to said fourth surface side in relation to said third surface.

3. The lid member according to claim 2, wherein said second plate portion has a fourth groove portion which extends approximately in a vertical direction to the ridge line portion, and said fourth groove portion is formed so as to be concaved to said fourth surface side in relation to said third surface.

4. The lid member according to claim 1,
wherein said second plate portion has a groove portion which extends approximately in a vertical direction to the ridge line portion, and
said groove portion is formed so as to be concaved to said fourth surface side in relation to said third surface.

5. A floor panel comprising:
an opening portion; and
a lid member which is attached to said opening portion,
wherein said lid member is provided with a first plate portion and a second plate portion which are adjacent to each other, and is approximately formed as an L-shaped form in cross section,
wherein said first plate portion has a predetermined thickness, and has a first surface defining an upper surface of the lid member and a second surface opposite to the first surface;
wherein said second plate portion has a predetermined thickness, and has a third surface defining a side surface of the lid member and a fourth surface opposite to the third surface;
said first surface being substantially perpendicularly in relation to the third surface, and said first surface being contiguous to the third surface,
said second surface being substantially perpendicularly in relation to the fourth surface, and said second surface being contiguous to the fourth surface,
said first and second plate portions having a ridge line portion at a boundary of said first and third surfaces,
length directions of the first and second plate portions being in parallel to a length direction of the ridge line portion, and
wherein said first plate portion has a plurality of first groove portions which extend approximately in parallel to said ridge line portion so as to be arranged side by side while being spaced from each other,
said plurality of first groove portions are formed so as to be concaved to said second surface side in relation to the first surface, and wherein said first plate portion has a plurality of second groove portions which are formed so as to be concaved to said second surface side in relation to the first surface, and said plurality of second grooves portions being connected at both end portions in a length direction respectively to said plurality of first groove portions,
a height position of a groove bottom surface of the first groove portions being aligned with a height position of a groove bottom surface of the second groove portions, and
wherein said plurality of second groove portions contain a first group of groove portions arranged closer to both ends portions in the length direction of said first plate portion and a second group of groove portions arranged closer to a center portion in the length direction of said first plate portion, and
wherein the first group of groove portions and the second group of groove portions are set in respective length directions so that an angle from said ridge line portion has a smaller incline in the first group of groove portions than in the second group of groove portions.

* * * * *